United States Patent [19]
Snyder

[11] 3,866,862
[45] Feb. 18, 1975

[54] RISER CONTROLS FOR GLIDING PARACHUTES

[76] Inventor: Stephen L. Snyder, 331 Cherry Hill Blvd., Cherry Hill, N.J. 08034

[22] Filed: Apr. 5, 1973

[21] Appl. No.: 348,058

Related U.S. Application Data

[62] Division of Ser. No. 244,034, April 14, 1972, Pat. No. 3,829,045.

[52] U.S. Cl. ................................................. 244/152
[51] Int. Cl. ............................................ B64d 17/34
[58] Field of Search ................ 244/DIG. 1, 145, 152

[56] References Cited
UNITED STATES PATENTS

| | | | |
|---|---|---|---|
| 2,117,319 | 5/1938 | Hart | 244/145 |
| 3,117,753 | 1/1964 | Ewing | 244/152 X |
| 3,170,661 | 2/1965 | Basnett | 244/152 |
| 3,450,377 | 6/1969 | Mitchell | 244/DIG. 1 UX |

FOREIGN PATENTS OR APPLICATIONS

| | | | |
|---|---|---|---|
| 1,343,242 | 10/1963 | France | 244/145 |
| 1,075,314 | 7/1967 | Great Britain | 244/DIG. 1 |
| 1,121,397 | 7/1968 | Great Britain | 244/145 |

*Primary Examiner*—George E. A. Halvosa
*Assistant Examiner*—Paul E. Sauberer
*Attorney, Agent, or Firm*—Clarence A. O'Brien; Harvey B. Jacobson

[57] ABSTRACT

Attitude and braking controls mounted on the riser webs interconnecting the body harness of a parachute with the canopy suspension lines. Steering lines extend from the brake controls to trailing portion of the canopy to distort the same during deployment. The steering lines are released when the canopy is fully inflated to permit forward glide of the parachute.

6 Claims, 6 Drawing Figures

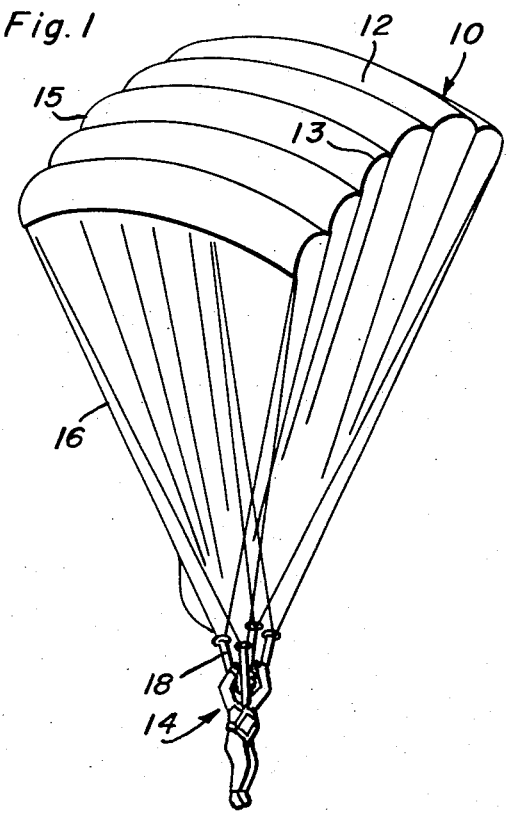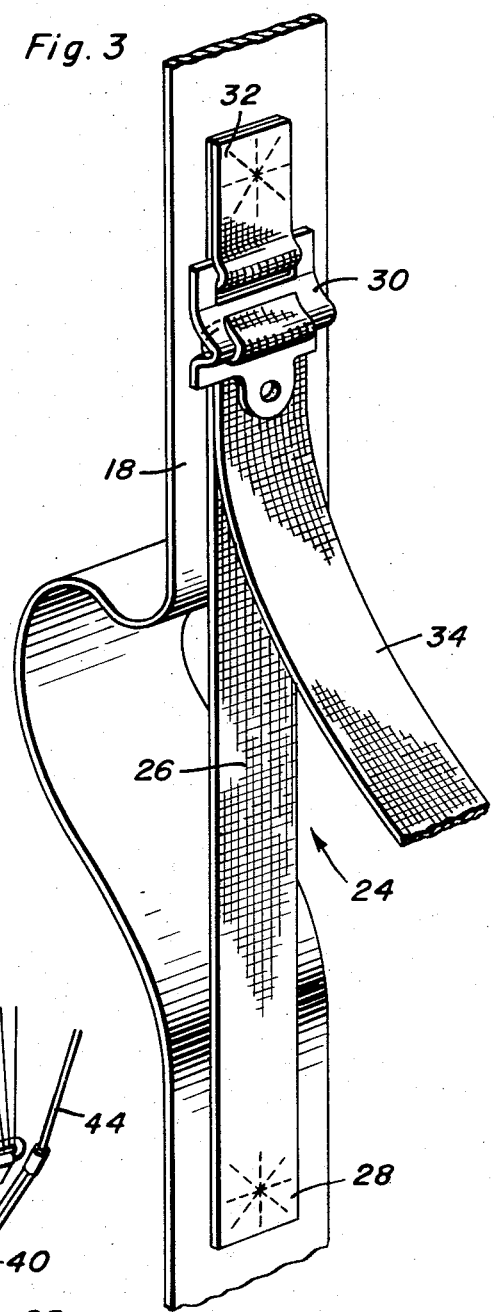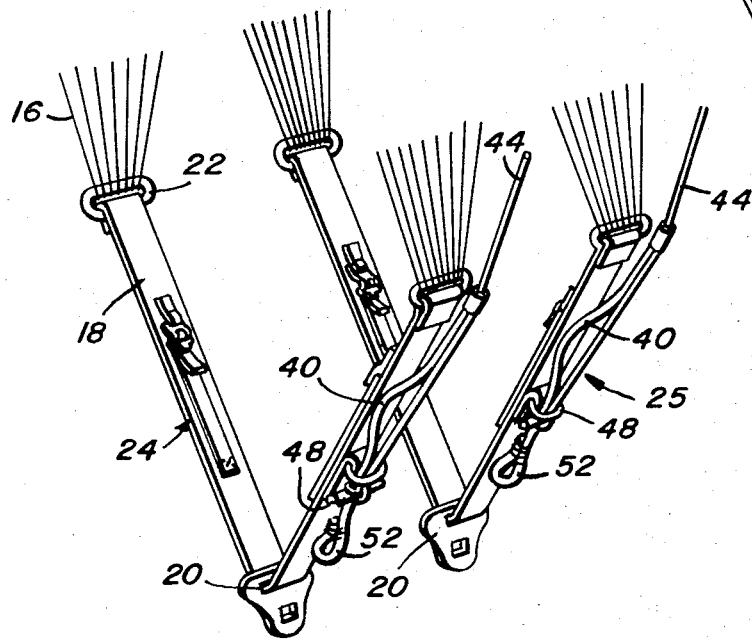

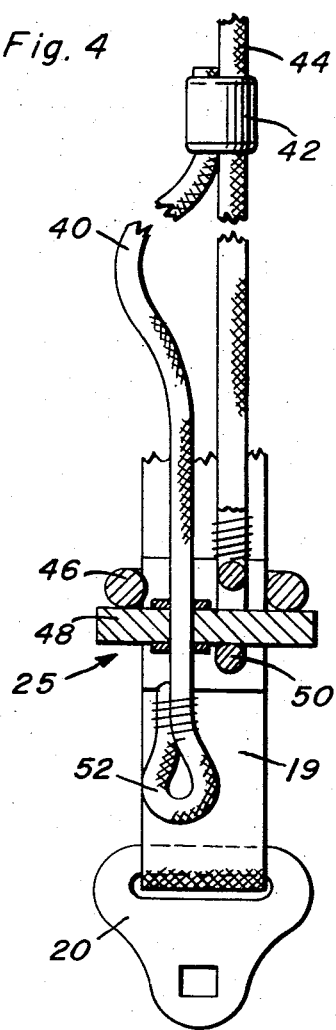
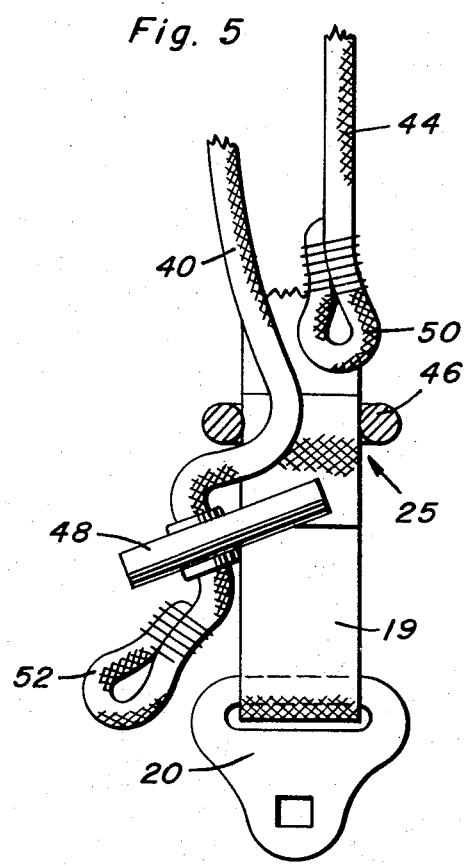
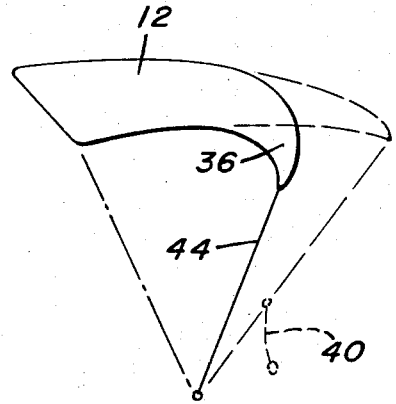

RISER CONTROLS FOR GLIDING PARACHUTES

This is a division, of application Ser. No. 244,034, filed Apr. 14, 1972, now U.S. Pat. No. 3,829,045.

This invention relates to parachute controls in general and more particularly to maneuvering controls for parachutes of the forward gliding type.

The provision of manually operable controls on the risers which interconnect the body harness and the suspension lines of a parachute, are well known. Such controls generally involve the attachment of control lines to selected suspension or shroud lines in order to enable the chutist to effect relative deflection of leading and trailing edge portions of the parachute canopy. Control over forward gliding types of parachutes having a planing surface curvature require, however, both differential and variable regulation of the riser strap lengths to be effective. Thus, an important object of the present invention is to provide means for enabling a parachutist to exercise effective maneuvering control over a forward gliding type of parachute.

In order to exercise effective control in accordance with the foregoing objective, it is necessary that the chutist be capable of infinitely varying the relative effective lengths of the risers during forward glide of the parachute. The rear risers are also provided with canopy brake controls to retard forward glide of the parachute until the canopy is fully inflated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating a typical forward gliding type of parachute in operation, with which the present invention is associated.

FIG. 2 is a perspective view showing a portion of the parachute illustrated in FIG. 1 with the maneuvering controls installed.

FIG. 3 is an enlarged partial sectional view showing one of the riser webs and control means attached thereto.

FIg. 4 is an enlarged partial sectional view showing another of the riser webs with a brake control mounted thereon.

FIG. 5 is a view similar to FIG. 4 showing the brake control released.

FIG. 6 is a simplified schematic view showing the braking action on the parachute.

Referring now to the drawings in detail, FIG. 1 illustrates a typical parachute generally denoted by reference numeral 1 which is of the forward gliding type. The invention may be applied to various types of parachutes having forward gliding capabilities. In the illustrated embodiment, the parachute 10 by way of example includes a "parawing" type of canopy 12 from which the payload or chutist 14 is shown suspended. Also, the parachute 10 is similar to most parachutes in that a plurality of suspension or shroud lines 16 are attached to various portions of the canopy 12 at their upper ends including the leading edge portion 13 and the trailing edge portion 15, while the lower ends of the suspension lines are connected to two pair of riser webs 18. The riser webs are in turn connected to the shoulder portions of the body harness worn by the chutist 14.

As more clearly seen in FIG. 2, each pair of riser webs 18 and 19 are connected to the body harness on either shoulder of the chutist through a harness buckle 20. The upper ends of the risers on the other hand, are provided with swivel devices 22 to which different groups of the suspension lines 16 are anchored. By controlling the effective length of the riser webs relative to each other or the spacing between the harness buckles 20 and the swivel devices 22, the chutist may be able to control the maneuvering of the parachute by relative deflection of portions of the canopy 12 to which the different groups of suspension lines 16 are connected. Accordingly, one or more of the riser webs 18 is provided with a control device generally denoted by reference numeral 24 which is within easy reach of the chutist. Also, the rear riser webs 19 are provided with canopy brake controls 25 of the toggle type.

Each of the riser webs 18 has a maximum effective length as shown in FIG. 2 which may be reduced by an infinitely variable amount as shown in FIG. 3. Each control device 24 accordingly includes a control strap 26 fixedly anchored to the riser web at a lower end 28. The control strap is threaded through a friction holding buckle device 30 which is mounted on the riser web 18 by means of the anchoring web 32 fixedly spaced from the anchoring location 28 for the control strap 26. It will therefore be apparent, thata the chutist may shorten the effective length of the riser web 18 to any degree by pulling the control strap 26 through the frictional holding buckle device 30 by means of trim tab portions 34. In this fashion, the chutist may differentially vary the spacing between the four different groups of suspension lines 16 and the body harness within which the chutist is supported to regulate the relative position of the leading and trailing edge portions 13 and 15 for attitude control. By pushing on the tabs 34, the buckle device 30 may be loosened to release the control strap permitting the control device to be reset under the tension applied to the web 18.

In conjunction with attitude control, turning and landing control, the parachute also includes brake controls 25. The brake controls operate to distort the trailing edge portion 36 by restricting its inflation during deployment of the parachute as shown by solid line in FIG. 6 and includes distortion control means consisting of a toggle pin 48 connected to a slack brake control line 40 secured at 42 to a line 44 shorter than the suspension lines 16. The control line 44 as more clearly seen in FIg. 4, extends through the toggle ring 46 which is secured to the riser web 19. In order to hold the control line under tension during deployment of the parachute, a toggle pin 48 extends through a holding loop 50 at the end of the steering line while in abutment with the toggle ring. The slack control line 40 is fixed to the toggle pin so that the chutist may exert an off-center pull thereon through release loop 52 in order to withdraw the toggle pin from loop 50 of the control line, as shown in FIG. 5. When the control line is released, the trailing end portion 36 of the parachute may assume a non-braking position, as shown by dotted line in FIG. 6 corresponding to continuous canopy curvature for forward glide when fully inflated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a parachute having a canopy and suspension lines connected to a body harness by a plurality of risers, maneuvering control means including a steering line connected to a trailing end portion of the parachute, a slack control line connected to the steering line between the trailing end portion and the risers, a toggle ring secured to one of the risers through which the steering and control lines extend, a holding loop connected to the steering line, a toggle pin adapted to extend through the holding loop while in abutment with the toggle ring for holding the steering line under tension, and release means connecting the control line to the toggle pin for withdrawal thereof from the holding loop.

2. In combination with a parachute having a canopy, a plurality of suspension lines connected thereto, a payload harness, a plurality of risers interconnecting the harness with the suspension lines, and brake control means mounted on at least one of the risers for distorting the canopy during deployment of the parachute, said brake control means including a steering line connected to a portion of the canopy and selectively controlled means for maintaining the steering line under tension, and selectively controlled means comprising a slack line connected to the steering line, a toggle ring secured to said one of the risers through which the steering and slack lines extend, a holding loop connected to the steering line, a toggle pin adapted to extend through the holding loop while in abutment with the toggle ring, and release means connecting the slack line to the toggle pin for withdrawal thereof from the holding loop.

3. In combination with a gliding parachute having a canopy with a continuous curvature when fully inflated, a plurality of suspension lines connected to the canopy and a payload harness connected to said suspension lines, brake control means operative on a portion of the canopy before complete deployment of the parachute, comprising at least one control line connected to said portion of the canopy, distortion control means connected to the control line between the canopy and the harness for maintaining the control line under tension to distort said portion of the canopy from the continuous curvature and thereby restrict inflation of the canopy during deployment of the parachute, and means connected to the control means for releasing the control line to permit unrestricted inflation of said portion of the canopy to said continuous curvature.

4. The combination of claim 3 wherein said control line is shorter than the suspension lines and when released by the releasing means is disconnected from the harness permitting forward glide of the parachute with the canopy fully inflated.

5. In combination with a parachute having a canopy, a plurality of suspension lines connected to the canopy and a payload harness connected to said suspension lines, brake control means operative on a portion of the canopy before complete deployment thereof, comprising at least one control line connected to said portion of the canopy, distortion control means connected to the control line between the canopy and the harness for maintaining the control line under tension to restrict inflation of said portion of the canopy and cause distortion thereof during deployment of the parachute, and means connected to the control means for releasing the control line to permit unrestricted inflation of said portion of the canopy, said control line being shorter than the suspension lines and when released by the releasing means is disconnected from the harness permitting forward glide of the parachute with the canopy fully inflated, said distortion control means including a slack line connected to the control line, a toggle ring connected to the harness, a holding loop connected to the control line and a toggle pin connected by the releasing means to the slack line adapted to extend through the holding loop while in abutment with the toggle ring to hold the control line under tension.

6. In combination with a parachute having a canopy, a plurality of suspension lines connected to the canopy and a payload harness connected to said suspension lines, brake control means operative on a portion of the canopy before complete deployment thereof, comprising at least one control line connected to said portion of the canopy and the harness for maintaining the control line under tension to restrict inflation of said portion of the canopy and cause distortion thereof during deployment of the parachute, and means connected to the control means for releasing the control line to permit unrestricted inflation of said portion of the canopy, said distortion control means including a slack line connected to the control line, a toggle ring connected to the harness, a holding loop connected to the steering line and a toggle pin connected by the releasing means to the slack line adapted to extend through the holding loop while in abutment with the toggle ring to hold the control line under tension.

* * * * *